Nov. 4, 1958 E. HENDRY 2,858,866
VEGETABLE TRIMMING MACHINE
Filed May 16, 1955 2 Sheets-Sheet 1
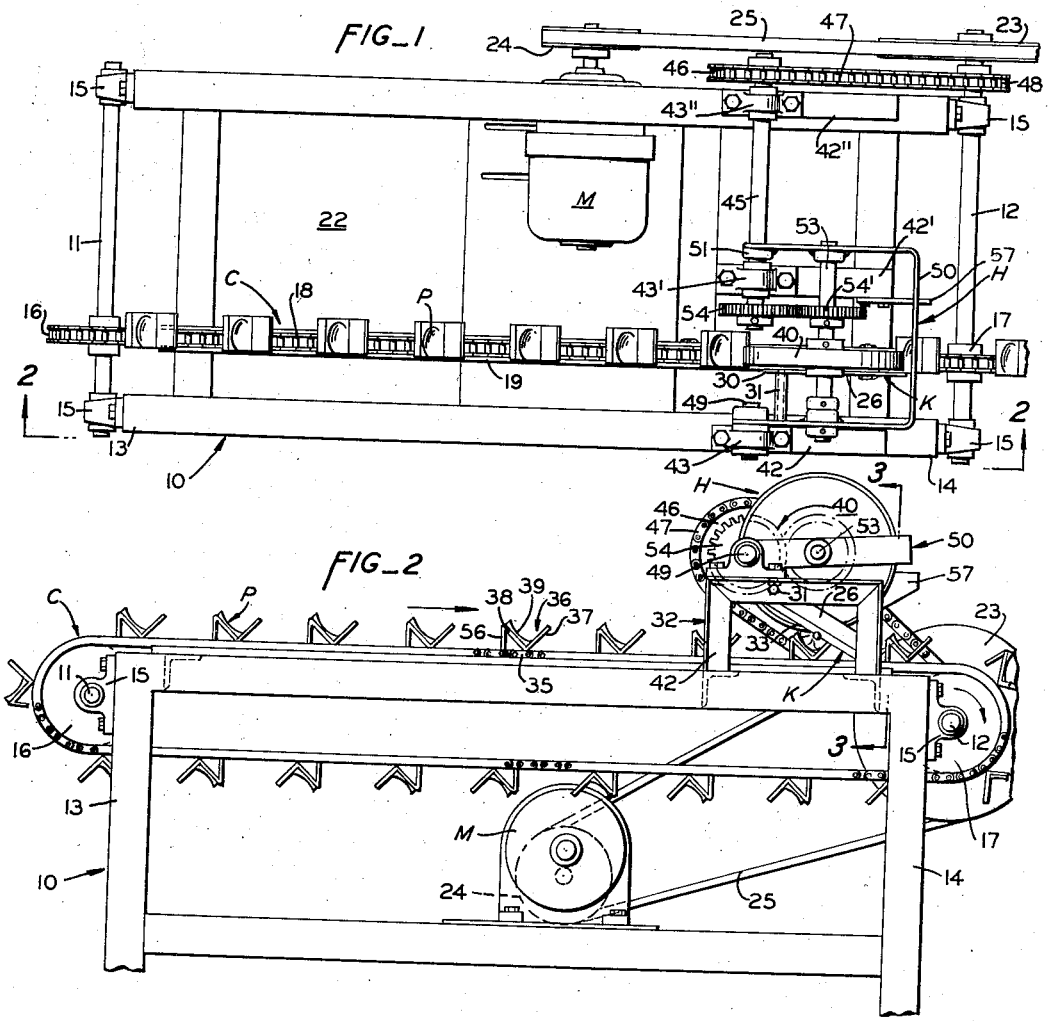
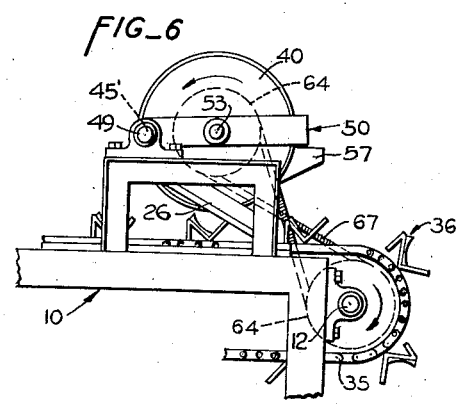
INVENTOR.
ELMER HENDRY
BY
Hansen and Lane
HIS ATTORNEYS Nov. 4, 1958 E. HENDRY 2,858,866
VEGETABLE TRIMMING MACHINE
Filed May 16, 1955 2 Sheets-Sheet 2
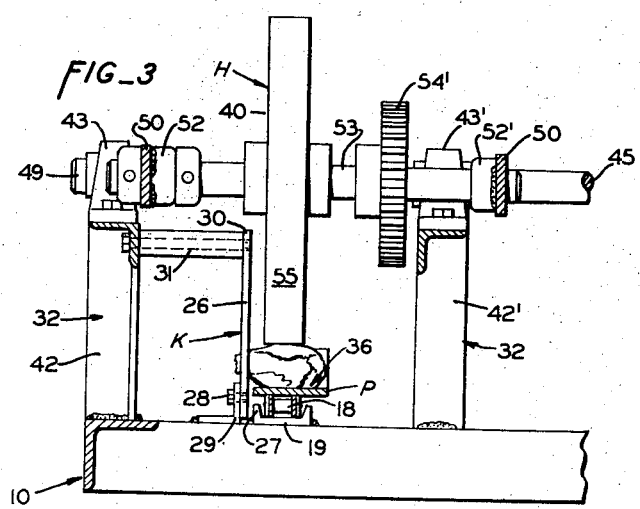
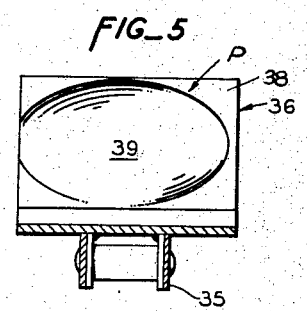
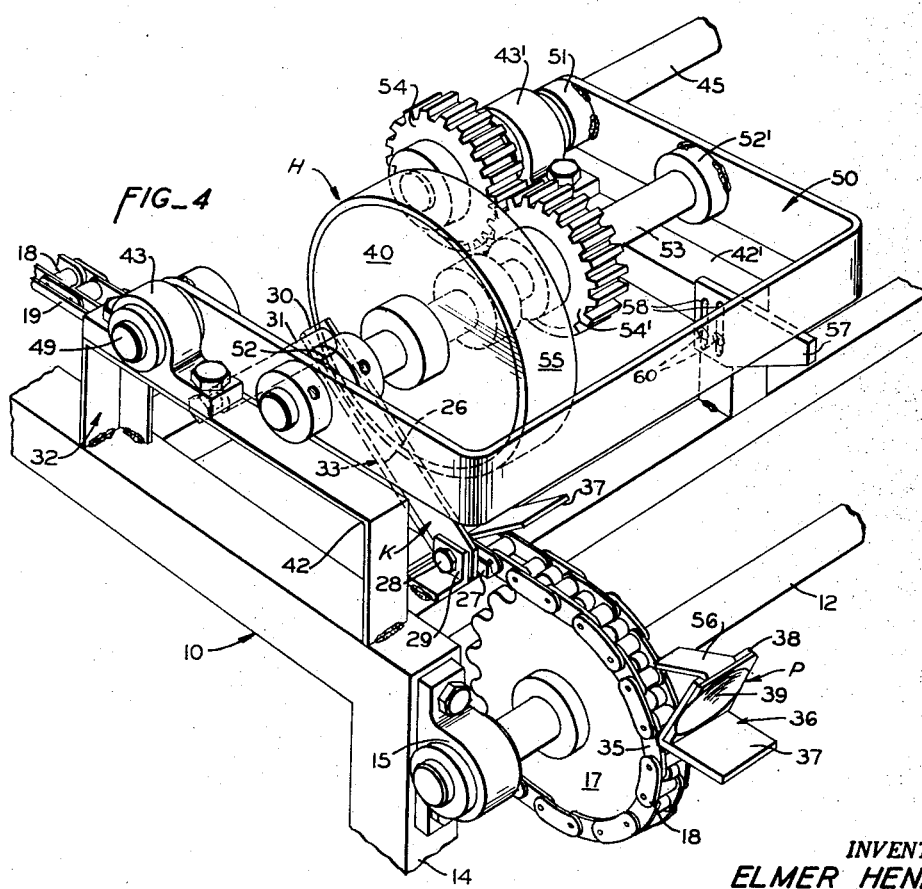
INVENTOR.
ELMER HENDRY
BY
Hansen and Lane
HIS ATTORNEYS

United States Patent Office 2,858,866
Patented Nov. 4, 1958

2,858,866

VEGETABLE TRIMMING MACHINE

Elmer Hendry, San Jose, Calif.

Application May 16, 1955, Serial No. 508,435

7 Claims. (Cl. 146—81)

This invention relates to trimming machines and more particularly to a machine for automatically trimming the stalk end of a vegetable.

While the present invention is specifically constructed to handle Brussels sprouts it will be apparent that it is equally adapted for the handling of other vegetables of like nature for trimming the stalk end therefrom. In particular, the present invention deals with the preparation of Brussels sprouts incident to packaging and freezing of the same for market.

As is well known, when Brussels sprouts are harvested they are plucked by breaking the stalk from the main plant. Therefore as fresh produce the sprouts come with large stalk or butt portions attached. While it does not matter too much that these stalks are attached on sprouts at vegetable stands, it is essential that they be neatly trimmed from sprouts to be sold in frozen packaged form. For one reason it is important to trim the sprout in the conventional sized frozen food package. Moreover, it is also important that quality merchandise is presented in the closed container to establish good will and a demand for prepared Brussels sprouts which are ready for cooking. This entails cutting the stalk at a point to trim off only three or four outer leaves of the sprout so that fresh green bud portions are presented for packaging.

It is one object of the present invention to provide a Brussels sprout trimming machine which is simple in construction, easy to operate and accurate and efficient in use.

Another object is to provide a sprout trimmer having sprout cups for presenting the sprouts to a cutting blade by which the butt ends are trimmed off.

Another object is to provide in a sprout trimmer having sprout cups on which the sprouts are supported and moved successively past a stationary blade, a means for stabilizing the sprout in each cup as it passes the blade. This object contemplates the provision of a stabilizer having no movement relative to the sprout during engagement thereof by the stabilizer and trimming blade. This feature includes means for driving or moving the stabilizer in synchronism with the movement of the sprouts past the trimming knife.

In addition to the foregoing it is an object to provide a stabilizer which is self-adjusted in accordance with the size of the sprout presented thereto irrespective of the motion of the stabilizer in synchronism with the oncoming sprouts.

These and other objects and advantages of the invention will become apparent from the following description when read in the light of the drawings in which:

Fig. 1 is a plan view of a trimming machine embodying the present invention.

Fig. 2 is a side elevation of Fig. 1 as seen from line 2—2 thereof.

Fig. 3 is an enlarged partial cross section through Fig. 2 taken along line 3—3 thereof.

Fig. 4 is a perspective view of that portion of the trimmer detailed in Fig. 3.

Fig. 5 is an enlarged detail of one of the produce cups embodied in this invention.

Fig. 6 is a partial section through the machine modified with a simplified drive for the sprout holding means therefor.

In general the device of the present invention comprises a conveyor C having produce cups P for presenting one article at a time to a trimming knife K and holding means H synchronized with the conveyor for firmly holding each article within the cup during movement thereof past the knife K.

Referring to Figs. 1 and 2, the device embodying the present invention is mounted on a bench or frame 10 adapted to be arranged in the vegetable preparation line of a cannery or frozen food plant. The frame 10 which may be of any desired length, supports transverse shafts 11 and 12 at its respective ends 13 and 14. The shafts 11 and 12 are journaled in suitable bearings 15 and each carry a sprocket 16 and 17 respectively adjacent the front face of the frame 10. The front face of the machine is that side of the frame where the attendant would stand to feed the sprouts into the cups P. Trained around the sprockets 16—17 is an endless chain 18 having its upper reach supported in a channel track 19 which is at counter or bench height.

A plurality of produce supporting cups P, to be described more specifically later, are mounted on the endless chain 18 in spaced relation therealong and for movement therewith. The foregoing arrangement comprises the conveyor portion C of the device of the present invention. At the left end 13 of the frame 10 is a tray 22 upon which the freshly cut produce, such as Brussels sprouts, are deposited from a cleaning conveyor or the like. Thus an attendant has the produce handy for manual feeding one by one into successive cups P of the conveyor C.

The movement of the produce supporting cups P is from left to right along the upper reach of the chain 18. In this connection, the shaft 11 at the left end 13 of the frame 10 is an idler shaft whereas the shaft 12 at the opposite end 14 of the frame is a drive or driven shaft. As best seen in Fig. 1, the drive shaft 12 extends slightly beyond the back of the frame 10 and has secured thereto a pulley 23. In alignment with the pulley 23 is a drive pulley 24 secured to the shaft of a motor M suitably mounted on the frame 10. The two pulleys 23—24 are drivingly connected by an endless belt 25. The ratio of the pulleys 23—24 is such that the conveyor C is driven at a desired speed conducive to manual feeding of produce one by one into the cups P as they pass the supply tray 22.

The trimming knife K is preferably a straight blade 26 disposed in a plane parallel to and adjacent the path of movement of the cups P on the conveyor C. The blade 26 is disposed adjacent the forward flange 27 of the channel track 19 and has its lower end secured by a bolt 28 to an angle clip 29 formed as a part of the frame 10. The blade 26 extends diagonally upwardly in the direction of approach of the cups P and has its upper end 30 suitably secured to a stud shaft 31 extending laterally from a bridge portion 32 on the counter height frame 10. It will thus be seen that the sharpened edge 33 of the blade 26 is set on a bias to afford a slicing cutting action to that portion of the produce extending toward the front face of the frame 10 from the moving cups P. It should here be noted that the thrust of the blade 26 against the extended stalk of the sprout is downwardly rearward which thrust is counteracted by reason of the shape of the cup P as now to be explained.

Each produce supporting cup P is identical in construction in that each is formed integrally with or as a part of one link 35 of the chain 18. As depicted in Figs. 3, 4 and 5 of the drawings the cup P comprises a trough-like body 36 disposed transverse to the chain 18. In this connection the base of the trough is either welded or brazed to the link 35 or may be cast integrally therewith if desired. The trough-like body 36 is thus adapted to be supported open side up on the upper reach of the chain 18 as the cup passes along the track 19.

The trough-like body 36 stands in V-shape as seen from the front side of the device (Fig. 2) and thus provides a leading wall 37 and a trailing wall 38 on each cup P. The trailing wall 38 is provided with a dish-like recess 39 into which the bud of each Brussels sprout is adapted to be seated. The sprouts are deposited in each cup P with the stalk end of the produce extending toward the front face of the machine, i. e., transversely of the plane in which the blade 26 of knife K is mounted (see Fig. 3). Thus it will be seen that the angle of repose of the blade 26 is substantially parallel to the angular disposition of the trailing wall 38 of the trough-like body 36. Moreover, since the dish-like recess 39 is formed in the trailing wall 38 it will be apparent that the resistance offered by the blade 26 when it engages the stalk of the sprout tends to force the bud end of the sprout into the recess 39. Although the sprout thus tends to seat in the recessed trailing wall of the trough it will be noted that since the blade 26 engages an extended portion (the stalk) of the sprout, some means must be employed to secure the bud portion of the sprout in the cup P. This is accomplished by the holding means H now to be explained.

The holding means H is arranged on the frame 10 in the zone thereof embracing the knife K in such a position as to stabilize the article in the cup P irrespective of movement of the cup during trimming of the stalk by the knife. The holding means H comprises a weighing means in the form of a wheel 40 yieldably urged toward each cup P as it passes the knife K. The holding means H also contemplates self adjustment of the weighing means compensatory with the size of the sprout buds contained in the cups as they pass the trimming knife K.

In the present disclosure, the holding means consists of a unit at the right end 14 of the frame 10 including the bridge portion 32 previously mentioned. The bridge portion 32 is in the zone in which the knife K is situated and includes a pair of angle iron stands 42—42' having their legs secured to the top of the frame 10. The stand 42 is on the fore side of the chain 18 and the stand 42' on the aft side of the chain and each stand supports a bearing boss 43—43'. Another bearing boss 43'' is secured to the back wall of the frame 10 and all of these bearing bosses 43—43' and 43'' are in axial alignment with each other. The bearing bosses 43'—43'' support an auxiliary drive shaft 45 having a sprocket 46 secured to its rearmost end. A chain 47 trained around this sprocket 46 and a sprocket 48 secured to the main drive shaft 12, previously mentioned, serves to drive the auxiliary shaft 45 in timed relation with the conveyor C. The bearing boss 43 on the foremost stand 42 supports a stud shaft 49 extending forwardly from one leg of a U-shaped lever 50. The other leg of this lever 50 has a boss 51 mounted on the auxiliary shaft 45 so that the U-shaped lever 50 can rock about the axes of the aligned bearing bosses 43—43' and 43''.

Each leg of the U-shaped lever 50 is provided with a bearing boss 52—52' midway its ends to support a countershaft 53 for turning in parallel relation to the auxiliary drive shaft 45. It is on this countershaft 53 that the weighing means or wheel 40 is secured for turning therewith as well as oscillation toward and from the conveyor C. As best seen in Fig. 3 the wheel 40 is aligned with the conveyor chain 18 so that the periphery of the wheel engages each sprout during engagement of the latter by the knife K. A stop bracket 57 is secured to one of the bridge portions 32, preferably the one supporting the angle iron strand 42', as best seen in Fig. 4. This bracket 57 serves to limit downward swinging of the U-shaped lever 50 of the holding means H. The bracket 57 thereby serves to support the wheel 40 high enough above the cups P on the conveyor so as not to engage the cups but to engage the Brussels sprout supported in a cup. As seen in Fig. 4 the stop bracket 57 is adjustable up and down relative to the frame structure. To this end a pair of slots 58 are formed in the bracket 57 through which machine screws 60 can extend for threading into tapped bores in the bridge portion 32. In this manner downward movement of the lever 50 is limited so as to assure clearance between the cups P and the periphery of wheel 40 but also to assure adequate pressure from the periphery of the wheel 40 against a sprout supported in any cup P.

In order to assure against displacement of the sprouts from the cups during engagement of the sprout by the weighing wheel 40 the latter is driven in synchronism with the speed of the conveyor C. This is accomplished by a pair of spur gears 54—54', one on the auxiliary drive shaft 45 and the other on the countershaft 52. It should here be noted that these spur gears 54—54' are calculated to turn the weighing wheel 40 in a direction opposite to that of the conveyor C so that the lower segment of the wheel 40 travels unidirectionally with the conveyor chain 18. More particularly it should be noted that the motion transmitted to the wheel 40 is not disturbed during oscillation of the U-shaped lever 50 because the latter rocks radially about the axis of the auxiliary shaft 45. Thus it will be appreciated that the wheel 40 turns in unison with the conveyor even though the wheel 40 is raised and/or lowered slightly by variations in size of the sprouts in the cups P.

The weighing wheel 40 has a soft cushioning material such as sponge rubber 55 applied to its periphery to minimize bruising of the sprout buds as they are engaged. Note also in Fig. 2 that the axis of the counter shaft 53 is directly above a cup P when the stalk of a sprout therein engages the blade 26. Consequently the sprout bud is firmly held in the cup during slicing of the stalk from the sprout. Each cup P has a strut leg 56 extending downwardly from the upper edge of its trailing wall 38 to engage the chain 18 which is supported in the channel 19. In this manner rearward tilting or rocking of each cup during engagement of the blade 26 with the stalk of a sprout is resisted.

Referring now to Fig. 6 wherein I have shown a modified synchronous drive for the holding means it will be noted that the ultimate result is identical although fewer parts are required. In this modification, the U-shaped lever 50 remains the same but has the boss 51 on one of its legs mounted for pivotal movement on a stud shaft 45' rather than an auxiliary drive shaft 45. The spur gears 54—54' are eliminated and in their place a pulley 64 is secured to countershaft 53 and a similar pulley 64' secured to the main drive shaft 12. Trained around these pulleys 64—64' is an expandable belt 67. The drive shaft 12 turns pulley 64' as it did the sprocket 48. However, since the spur gears 54—54' are eliminated the belt 67 is twisted to attain reverse turning of the pulley 64 and countershaft 53. In this manner the weighted wheel 40 is turned as before to maintain the sprout buds in the respective cups.

Since the wheel 40 is caused to oscillate dependent upon the size of the sprout engaged thereby, the countershaft 53 is shiftable toward and from the drive shaft 12. That is the reason for using an expandable belt 67. In other words, the belt 67 stretches and retracts correspondingly with the movement of wheel 40 as it engages the sprouts. In addition thereto the belt 67 is a tension spring serving to urge the wheel 40 toward the cups P for firmly holding the sprout buds within the same.

During operation of the device of this invention the conveyor C is constantly in motion so that the cups P pass the tray 22 at a speed conducive to manual feeding of sprouts thereto. Each sprout is placed in a cup P with its bud portion resting in the recess 39 of the V-shaped trough like body 36 and with the stalk portion of each sprout extending forwardly therefrom. As the stalk portion of each sprout is about to move into engagement with the knife K the bud portion of each sprout is engaged by the cushioned periphery of the wheel 40. By reason of the synchronous drive of the wheel 40 by way of spur gears 54—54' the periphery of the wheel 40 is moving substantially the same speed as is the bud of the sprout. Consequently there is no relative movement between the sprout and the periphery of the wheel 40 as the latter weighs down upon the sprout during trimming of the stalk therefrom. This is so even though the wheel 40 is free to oscillate by reason of variations in size of the sprout bud engaged thereby. Thus each sprout bud is firmly held in the cup carrying it during trimming of the stalk.

In addition to the foregoing the sharpened edge 33 of the knief blade engages the stalk portion of the sprout in slicing fashion rather than as a straight forward shearing thrust. That is to say, it is just as though the blade 26 were drawn across the stalk in slicing fashion so that the trimming action is gradual during movement of the sprout past the knife K. Since the blade 26 is parallel to the rearmost wall 38 of the cup P, this slicing action has a tendency to press the sprout bud downwardly and rearwardly relative to the trough-like cup P. More particularly the sprout bud is seated in the recess 39 of the rearmost wall 38 of the cup and firmly held therein by the weighted wheel 40. Keeping in mind that the blade 26 has entered the stalk of the sprout at the base of the bud portion thereof it will be appreciated that shifting of the sprout bud in a fore or aft direction within the cup is minimized.

In the foregoing manner the stalk is trimmed from each sprout and will fall directly down. Thereafter the sprout bud is disengaged from the holding means, i. e., the cushioned periphery of the wheel 40 for continued movement by the conveyor. As each cup P turns over the sprocket 17 at the right hand end 14 of the machine (see Fig. 4) the sprout bud is discharged therefrom into any suitable receptacle (not shown) and is ready for packaging.

While I have described my new sprout preparation machine in specific detail it will be appreciated by those skilled in the art that these details may be varied, altered and/or modified without departing from the spirit of my invention. I therefore desire to avail myself of all variations, alterations, and/or modifications as fairly come within the purview of the appended claims.

What I claim as new and desire to protect by Letters Patent is:

1. In a vegetable trimming machine of the type including a trimming knife, a conveyor having a plurality of cups for supporting individual vegetables with their stalk ends disposed to engage said trimming knife, and drive means for said conveyor; means for engaging each vegetable as it is having its stalk end trimmed by said trimming knife comprising a lever pivotally mounted for swinging movement about a predetermined axis vertically above said conveyor, a stud shaft journalled in the free end of said lever in parallel relation to said predetermined axis, a wheel secured to said stud shaft in alignment with the path of movement of said conveyor and having its periphery disposed to engage each vegetable as it is moved past said trimming knife, stop means engageable by said lever for maintaining clearance between said cups and the periphery of said wheel, a shaft journalled adjacent said conveyor in axial alignment with said predetermined axis, a gear fixed to said shaft, a gear fixed to said stud shaft and in mesh with said first named gear irrespective of movement of said lever by reason of variations in size of vegetables engaged by said wheel thereon, and means for drivingly connecting said shaft to said drive means for turning said wheel in synchronism with the movement of the conveyor thereby so that no relative movement between the periphery of said wheel and a vegetable engaged thereby occurs as the wheel holds the vegetable down in its cup during trimming of the stalks from the vegetables.

2. In a sprout trimming machine including a trimming knife, a conveyor including a plurality of cups for supporting sprouts with their stalk ends disposed to engage said trimming knife and drive means for said conveyor; means for holding a sprout in said cup during engagement of the stalk of said sprout by said knife comprising a lever pivotally mounted on said machine above said conveyor, a wheel mounted for turning movement adjacent the free end of said lever having its periphery disposed in alignment with the line of travel of said cups, stop means on said machine for limiting downward movement of said lever and wheel for causing the periphery of said wheel to bear upon a sprout only disposed in a cup as it passes said knife, and power transmission means operatively connecting said wheel to said drive means for turning said wheel in synchronism with said conveyor so that no relative movement occurs between the sprouts in said cups and said wheel as the latter holds the sprouts in said cups.

3. In a sprout trimming machine including a trimming knife, a conveyor including a plurality of cups for supporting sprouts with their stalk ends disposed to engage said trimming knife and drive means for said conveyor; means for holding a sprout in said cup during engagement of the stalk of said sprout by said knife comprising a lever pivotally mounted on said machine above said conveyor, a wheel journaled adjacent the free end of said lever with its periphery disposed to engage a sprout as the cup supporting the latter passes said knife, a stop bracket on said machine engageable by said lever for limiting downward movement of the latter to support said wheel in spaced relation to said cups, and means for turning said wheel in synchronism with said conveyor during movement of the latter relative to said knife to effect static engagement of the periphery of said wheel with a sprout irrespective of movement of said lever by reason of the size of a sprout engaged by said wheel.

4. A Brussels sprout trimming machine comprising a counter height frame, an endless strand conveyor in a vertical plane on said frame having its upper reach disposed to travel horizontally along the same, drive means for said conveyor, a channel track for supporting the upper reach of said conveyor, a plurality of V-troughs secured to said conveyor transversely of the direction of movement thereof for receiving and supporting a sprout bud with its stalk end extending from said trough, each said trough presenting a trailing wall recessed to seat a sprout bud therein, a blade disposed diagonally upward and rearwardly in parallelism to the trailing wall of said troughs and adjacent that end thereof from which the stalk of said sprouts extend for slicingly engaging said stalks as they pass said blade, and means for engaging the sprout in each trough as it passes said blade for holding said sprout firmly and without relative movement with respect thereto during slicing of the stalk portion therefrom comprising a lever pivotally mounted on said frame for movement about a predetermined axis and in the vertical plane of said conveyor and above the upper reach thereof, a stud shaft journaled in the free end of said lever, a wheel secured to said stud shaft having its periphery disposed to engage a sprout as its stalk is engaged by said blade, a stop bracket on said frame engageable by said lever for limiting downward movement of said wheel to afford clearance between the periphery of said wheel and the troughs on said conveyor, a shaft journaled on said frame coaxially of said predetermined axis, means drivingly connecting said shaft to said drive means, a gear on said shaft, and gear means connected to said stud shaft in mesh with said gear irrespective of movement of said lever up and down about said predetermined axis for turning said wheel in synchronism with said conveyor whereby the periphery of said wheel has static contact with a sprout engaged thereby.

5. A Brussels sprout trimming machine comprising a counter height frame, an endless chain conveyor on said frame having its upper reach disposed to travel horizontally along the same, drive means for said conveyor, a channel track for supporting the upper reach of said conveyor, a plurality of V-troughs secured to said conveyor transversely of the direction of movement thereof for receiving and supporting a sprout bud with its stalk end extending from said trough, each said trough presenting a trailing wall recessed to seat a sprout bud therein, a blade disposed diagonally upward and rearwardly in parallelism to the trailing wall of said troughs and adjacent that end thereof from which the stalk of said sprouts extend for slicingly engaging said stalks as they pass said blade, a downwardly extending strut on the trailing wall of each of said troughs adapted to engage said endless chain for resisting rearward tilting of said trough when said blade engages the stalk of a sprout therein, and means for engaging the sprout in each trough as it passes said blade for holding said sprout firmly during slicing of the stalk portion therefrom, comprising a lever mounted above said conveyor for swinging movement toward and from the same, a wheel journaled on the free end of said lever with its periphery disposed to weigh down upon a sprout as its stalk portion engages said blade, a stop bracket on said frame engageable by said lever for limiting downward movement of said wheel to afford clearance between the periphery of said wheel and the troughs on said conveyor, and power transmission means between said drive means and said wheel for turning the latter in synchronism with said conveyor to thereby effect static engagement of the periphery of said wheel with a sprout as it moves past said blade.

6. A Brussels sprout trimming machine comprising a counter height frame, an endless chain conveyor on said frame having its upper reach disposed to travel horizontally along the same, a channel track for supporting the upper reach of said conveyor, a plurality of V-troughs secured to said conveyor transversely of the direction of movement thereof for receiving and supporting a sprout bud with its stalk end extending from said trough, each said trough presenting a trailing wall recessed to seat a sprout bud therein, a blade disposed diagonally upward and rearwardly in parallelism to the trailing wall of said troughs and adjacent that end of said trough from which the stalk of said sprouts extend for slicingly engaging said stalks as they pass said blade, a downwardly extending strut on the trailing wall of each of said troughs adapted to engage said endless chain for resisting rearward tilting of said trough when said blade engages the stalk of a sprout therein, and means for engaging the stalk of a sprout in each trough as it passes said blade for holding said sprout firmly during slicing of the stalk portion therefrom, comprising a lever mounted above said conveyor for swinging movement toward and from the same, a wheel journaled on the free end of said lever with its periphery disposed to weigh down upon a sprout as its stalk portion engages said blade, stop means on said frame for limiting downward movement of said wheel for maintaining the periphery of the latter in spaced relation to the troughs on said conveyor, and drive means for said conveyor coupled to said wheel for turning the latter so that its periphery travels at a linear speed comparable to the movement of said sprouts by said conveyor.

7. In a vegetable trimming machine of the type including a conveyor having a plurality of cups for supporting individual vegetables with their stalk ends disposed to engage a trimming knife and means for driving said conveyor for moving said cups past said trimming knife; means for engaging each vegetable as it is having its stalk end trimmed by said trimming knife comprising a lever pivotally mounted for swinging movement toward and from said conveyor, a stud shaft journaled in the free end of said lever transversely of the line of movement of said conveyor, a wheel secured to said shaft in alignment with the path of movement of said conveyor and having its periphery disposed to engage each vegetable as it moves past said trimming knife, stop means on said machine engageable by said lever for maintaining a clearance between said cups and the periphery of said wheel, a pulley on said drive means, a pulley on said stud shaft, and a stretchable belt trained around said pulleys for driving said wheel in synchronism with said conveyor to effect static contact between the periphery of said wheel and a sprout engaged thereby and for yieldably urging said wheel toward said sprouts.

References Cited in the file of this patent

UNITED STATES PATENTS

| | | |
|---|---|---|
| 417,744 | Ross | Dec. 24, 1889 |
| 1,640,745 | Ayars | Aug. 30, 1927 |
| 2,173,336 | Lamere et al. | Sept. 19, 1939 |
| 2,491,950 | Bridge | Dec. 20, 1949 |
| 2,580,599 | Rogers | Jan. 1, 1952 |

FOREIGN PATENTS

| | | |
|---|---|---|
| 650,653 | Great Britain | Feb. 28, 1951 |